(12) United States Patent
Borra et al.

(10) Patent No.: US 12,557,198 B2
(45) Date of Patent: Feb. 17, 2026

(54) CONTROL DEVICE FOR CONTROLLING A RADIOFREQUENCY-BASED SENSING SYSTEM AND A METHOD THEREOF

(71) Applicant: SIGNIFY HOLDING B.V., Eindhoven (NL)

(72) Inventors: Tobias Borra, Rijswijk (NL); Bartel Marinus Van De Sluis, Eindhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 70 days.

(21) Appl. No.: 18/719,309

(22) PCT Filed: Dec. 8, 2022

(86) PCT No.: PCT/EP2022/084979
§ 371 (c)(1),
(2) Date: Jun. 13, 2024

(87) PCT Pub. No.: WO2023/110619
PCT Pub. Date: Jun. 22, 2023

(65) Prior Publication Data
US 2025/0071872 A1 Feb. 27, 2025

(30) Foreign Application Priority Data
Dec. 13, 2021 (EP) ..................................... 21213926

(51) Int. Cl.
*H05B 47/115* (2020.01)
*A61L 2/10* (2006.01)
(Continued)

(52) U.S. Cl.
CPC .............. *H05B 47/115* (2020.01); *A61L 2/10* (2013.01); *G01S 13/56* (2013.01); *G01S 13/88* (2013.01); *H05B 47/19* (2020.01)

(58) Field of Classification Search
CPC ......... H05B 47/115; H05B 47/19; A61L 2/10; G01S 13/56; G01S 13/88
See application file for complete search history.

(56) References Cited

U.S. PATENT DOCUMENTS 10,816,939 B1 * 10/2020 Coleman ................. G01S 17/86
11,020,502 B1 * 6/2021 Medendorp, Jr. ......... A61L 9/20
(Continued)

FOREIGN PATENT DOCUMENTS

EP         3511736 A2    7/2019
WO      2020035429 A1    2/2020
(Continued)

*Primary Examiner* — Adam D Houston (57) ABSTRACT

A method of controlling a radiofrequency-based sensing system, wherein the radiofrequency-based system comprises a plurality of nodes each arranged for transmitting and/or receiving radiofrequency signal for radiofrequency-based sensing in an environment; wherein the method comprises: selecting a first set of nodes from the plurality of nodes to form a first subset and a second set of nodes from the plurality of nodes to form a second subset; wherein the selection is based on a direction of communication path from a transmitting node to a receiving node in the plurality of nodes; assigning a first radiofrequency-based sensing function to the first subset and a second radiofrequency-based sensing function or a modified first radiofrequency-based sensing function to the second subset; instructing the first subset to perform the first radiofrequency-based sensing function and the second subset to perform the second radiofrequency-based sensing function or the modified first radiofrequency-based sensing function.

15 Claims, 4 Drawing Sheets

(51) Int. Cl.
  *G01S 13/56*  (2006.01)
  *G01S 13/88*  (2006.01)
  *H05B 47/19*  (2020.01)

(56) References Cited

U.S. PATENT DOCUMENTS

| | | | |
|---|---|---|---|
| 12,320,896 B1* | 6/2025 | Erdozain, Jr. | G01S 17/89 |
| 12,426,142 B2* | 9/2025 | Lin | H05B 47/196 |
| 2008/0265802 A1* | 10/2008 | Van de Sluis | H05B 47/19 315/297 |
| 2015/0022123 A1* | 1/2015 | Van De Sluis | H05B 47/19 315/312 |
| 2015/0154849 A1 | 6/2015 | Matsui et al. | |
| 2018/0035513 A1* | 2/2018 | Magielse | H05B 47/19 |
| 2018/0098408 A1* | 4/2018 | Hubbers | H05B 47/155 |
| 2018/0285673 A1* | 10/2018 | Arnold | G06T 7/62 |
| 2019/0350069 A1* | 11/2019 | Van Der Zwaag | H05B 47/1965 |
| 2019/0357338 A1* | 11/2019 | Magielse | H05B 47/19 |
| 2020/0413520 A1* | 12/2020 | Aliakseyeu | H05B 47/1985 |
| 2021/0090151 A1* | 3/2021 | Bergman | H05B 47/19 |
| 2021/0099970 A1 | 4/2021 | Omer | |
| 2021/0112647 A1* | 4/2021 | Coleman | G01S 17/42 |
| 2021/0274620 A1* | 9/2021 | Meerbeek | H05B 47/12 |
| 2021/0397840 A1* | 12/2021 | Van De Sluis | H04N 21/42204 |
| 2022/0014879 A1* | 1/2022 | Aliakseyeu | G06Q 30/0251 |
| 2022/0151039 A1* | 5/2022 | Van De Sluis | H05B 47/125 |
| 2022/0151046 A1* | 5/2022 | Aliakseyeu | H05B 47/19 |
| 2022/0295622 A1* | 9/2022 | Krajnc | H05B 47/19 |
| 2024/0288381 A1* | 8/2024 | Stowell | H01Q 13/20 |
| 2025/0071872 A1* | 2/2025 | Borra | G01S 13/88 |

FOREIGN PATENT DOCUMENTS

| | | |
|---|---|---|
| WO | 2020037399 A1 | 2/2020 |
| WO | 2020043592 A1 | 3/2020 |
| WO | 2021023725 A1 | 2/2021 |
| WO | 2021140028 A1 | 7/2021 |

\* cited by examiner

CONTROL DEVICE FOR CONTROLLING A RADIOFREQUENCY-BASED SENSING SYSTEM AND A METHOD THEREOF

CROSS-REFERENCE TO PRIOR APPLICATIONS

This application is the U.S. National Phase application under 35 U.S.C. § 371 of International Application No. PCT/EP2022/084979, filed on Dec. 8, 2022, which claims the benefit of European Patent Application No. 21213926.5, filed on Dec. 13, 2021. These applications are hereby incorporated by reference herein.

FIELD OF THE INVENTION

The invention relates to a method of controlling a radiofrequency-based sensing system. The invention further relates to a control device, a system, and a computer program product for controlling a radiofrequency-based sensing system.

BACKGROUND

Radiofrequency based sensing is a sensing mechanism involving wireless transceivers (or transmitters/receivers) arranged for transmitting and receiving radiofrequency signals for radio communication. The radiofrequency signals when passing through a sensing volume, are affected by movement of an object (e.g., a person, an animal etc.) within the sensing volume, for instance via reflection, absorption, scattering, etc. of the radiofrequency signals. The radiofrequency-based sensing uses such deviations of the radiofrequency signals to infer presence of the object. Other functions or applications of the radiofrequency-based sensing may involve location detection, fall detection, gesture detection, sleep pattern monitoring, breathing detection etc. which are also based on how radiofrequency signals are affected in the sensing volume.

Connected lighting system is referred to a system of one or more lighting devices which are controlled not by (or not only by) a traditional wired arrangement, but rather by using a data communications protocol via a wired or more often wireless connection, e.g. a wired or wireless network. Since such connected lighting systems becoming more and more ubiquitous and sensing capability such as radiofrequency-based sensing also becoming increasingly popular, it makes sense to take advantage of a connected lighting system, and equipped them these sensing capabilities.

EP 3511736A2 discloses a motion sensing method which includes monitoring for a first motion in a first region using a first antenna using a first motion detection parameter, when no first motion is sensed by the monitoring using the first antenna monitoring for a second motion in a second region using a second antenna using a second motion detection parameter, and when no second motion is sensed by monitoring using the second antenna designating a space, which encompasses the second region as unoccupied, wherein the first region and the second region overlap one another, and the first motion detection parameter is different from the second motion detection parameter.

SUMMARY OF THE INVENTION

The inventors have realized that by taking into account the architecture and layout of the connected lighting system, for instance, the arrangement of lighting devices or other connected devices in the connected lighting system, the performance and the richness of radiofrequency-based sensing can be improved.

It is therefore an object of the present invention to improve performance of radiofrequency-based sensing system.

According to a first aspect, the object is achieved by a method of controlling a radiofrequency-based sensing system, wherein the radiofrequency-based system comprises a plurality of nodes each arranged for transmitting and/or receiving radiofrequency signals for radiofrequency-based sensing in an environment; wherein the method comprises: selecting a first set of nodes from the plurality of nodes to form a first subset and a second set of nodes from the plurality of nodes to form a second subset; wherein the selection is based on a direction of communication path from a transmitting node to a receiving node in the plurality of nodes; assigning a first radiofrequency-based sensing function to the first subset and a second radiofrequency-based sensing function or a modified first radiofrequency-based sensing function to the second subset; instructing the first subset to perform the first radiofrequency-based sensing function and the second subset to perform the second radiofrequency-based sensing function or the modified first radiofrequency-based sensing function.

The method is related to controlling a radiofrequency-based sensing (RF sensing) system. Controlling of RF sensing system may comprise, e.g., setting up and/or (re)adjusting parameters of the RF sensing system, selecting different RF sensing functions, which affects the RF sensing system performance. The RF sensing system may comprise a plurality of nodes each arranged for transmitting and/or receiving radiofrequency signals for radiofrequency-based sensing in an environment. The system may comprise any n number of nodes, wherein n>1. Each node may comprise a transmitter/receiver or a transceiver such that each node can transmit and/or receive radiofrequency signals for radiofrequency-based sensing. The environment may be an indoor environment such as an office, a home, a factory, a retail store etc. or an outdoor environment such as a street.

The method may comprise selecting a first set of nodes from the plurality of nodes to form a first subset and a second set of nodes from the plurality of nodes to form a second subset. The first set of nodes or the first subset may comprise n number of nodes, wherein n may be greater than 1. Similarly, the second set of nodes or the second subset may comprise n number of nodes, wherein n may be greater than 1. In other words, each subset comprises at least two nodes from the plurality of nodes. In an example, the first subset and the second subset may have the same number of nodes. Alternatively, the first subset and the second subset may have different number of nodes. The first subset and the second subset may be at least partially overlapping. In an example, the first and the second subset may be completely overlapping. The overlap may be understood as common nodes in both subsets.

The selection of a first set of nodes and a second set of nodes may be based on a direction of communication path from a transmitting node to a receiving node in the plurality of nodes. A communication path may refer to the tracks or route taking by potential communication which may occur between communicating nodes. In an example, communication path may comprise the dominant communication path, which for instance may be based on the mounting orientation of the node, beam shaping etc.

The method may further comprise assigning a first radiofrequency-based sensing function to the first subset and a second radiofrequency-based sensing function or a modified first radiofrequency-based sensing function to the second subset. RF sensing function may comprise a sensing task for the radiofrequency-based sensing, e.g., detecting presence, activity, location, breathing rate, sleep patterns etc. A modified first radiofrequency-based sensing function may be different from the first radiofrequency-based sensing function, for instance, with a difference in sensing parameters, such as modified transmission power, sensitivity etc.

The method may further comprise instructing the first subset to perform the first radiofrequency-based sensing function and the second subset to perform the second radiofrequency-based sensing function or the modified first radiofrequency-based sensing function. Since, the first and the second subsets are formed considering based on the direction of communication path between the communicating nodes, and the RF sensing functions are assigned based thereon, the architecture or the layout of the communicating nodes is considered to improve the performance of RF sensing system.

In an embodiment, the first subset may comprise nodes having a direction of communication path from a transmitting node to a receiving node in a first plane, and the second subset may comprise nodes having a direction of communication path from a transmitting node to a receiving node in a second plane. In an embodiment, the first plane may be orthogonal to the second plane.

An arrangement or layout of nodes may define the communication path between the nodes. The layout may be based on respective locations of the nodes with respect to each other. For example, arrangement of nodes, e.g., lighting devices, in shelves in retail or in storage/warehouse environments may form a grid structure. Due to such a structure, the direction of communication path may be comprised in different planes. Lighting nodes arranged in a 3D grid in a retail or warehouse environment may have communication paths in at least two different planes, i.e., the first plane and the second plane. In an example, the planes may be orthogonal to each other, such as a vertical plane and a horizontal plane. Since, nodes having communication paths in different planes are assigned different sensing function, the capabilities of RF sensing system are further improved.

In an embodiment, the first subset may be arranged for performing the first radiofrequency-based sensing function in a first area and the second subset may be arranged for performing the second radiofrequency-based sensing function or the modified first radiofrequency-based sensing function in a second area.

In this advantageous embodiment, the first subset may be advantageously arranged for performing the first radiofrequency-based sensing function, e.g., object or people presence in a first area, for instance, general (traffic or entrance) area, and the second subset may be advantageously arranged for performing the second radiofrequency-based sensing function or the modified first radiofrequency-based sensing function in the second area for instance detecting occupancy of a space (e.g. fitting room, plane or train seat or car parking space). Further examples may include detecting presence near a shelf in a retail environment and detecting user activity/presence above/below/at the shelf, detecting presence near a fitting room and detecting presence inside a fitting room. The second area may be different in size compared to the first area, e.g., smaller than the first area. Alternatively, the second area may be the same in size compared to the first area.

In an embodiment, the first radiofrequency-based sensing function may be presence detection, and the second radiofrequency-based sensing function may be activity detection.

In this example, the first radiofrequency-based sensing function may be presence detection, e.g., performed by the first set of nodes having communication paths in the horizontal plane in a retail environment, and the second radiofrequency-based sensing function may be activity detection, e.g., performed by the second set of nodes having communication paths in vertical plane in the retail environment.

In an embodiment, at least one of the plurality of nodes may be arranged for transmitting electromagnetic radiation signals in the ultraviolet frequency (UV) spectrum; and wherein the at least one of the plurality of nodes may be arranged for transmitting UV signals after the second subset has detected an activity and the first subset no longer detects presence In this example, at least one of the plurality of nodes may be a disinfection device, e.g., a disinfection lighting device, arranged for transmitting electromagnetic radiation signals in the ultraviolet frequency (UV) spectrum. In an example, the at least one of the plurality of nodes may be comprised in a first and/or in a second subset. In an alternate example, the at least one of the plurality of nodes may not comprised in either the first or the second subset. The disinfection node may be arranged for transmitting UV radiation signals after the second subset has detected an activity and the first subset no longer detects presence. For example, in a retail environment, when the activity has been detected, for instance, the user has picked a product from the shelf, and when the presence is no longer, for instance, the user has already left, then the disinfection node is advantageously arranged for transmitting UV radiation signals to further improve sanitization of the place and to protect harmful effect on a human body.

In an embodiment, the plurality of nodes may be further arranged for transmitting and/or receiving radiofrequency signals for network communication.

In this advantageous embodiment, the radiofrequency signals may also be used for network communication. The network communication may comprise a wireless communication protocol of any suitable type, including for example Bluetooth, ZigBee, UWB or WiFi, with the nodes having appropriate corresponding circuitry for the protocol.

In an embodiment, the plurality of nodes may comprise one or more lighting devices arranged to emit light for illuminating the environment, wherein the method may further comprise controlling the one or more lighting devices based on a first set of control parameters according to the first radiofrequency-based sensing function and controlling one or more lighting devices based on a second set of control parameters according to the second radiofrequency-based sensing function.

In this example, the plurality of nodes may comprise one or more lighting devices for illuminating the environment. The one or more lighting devices may be controlled based on the first and/or the second set of control parameters. The control parameters may comprise input current, voltage, orientation of the one or more lighting devices, etc. which may be related to controlling the lighting devices to render one or more (predetermined) light effects. For example, the light effects may comprise color, color temperature, intensity, beam width, beam direction, illumination intensity, and/or other parameters of light sources of the one or more lighting devices. In an example, the first and the second set of control parameters render the same light effect, e.g., the first and the second set of control parameters are the same.

The lighting devices may be controlled based on an outcome of the first and/or the second radiofrequency functions. In an example, the one or more lighting devices may be comprised in the first subset and/or in the second subset, and the lighting devices in the first subset may be controlled based on an outcome of the first radiofrequency function and/or the lighting devices in the second subset may be controlled based on an outcome of the second radiofrequency function. Additionally, and/or alternatively, the lighting devices comprised in the first subset may be controlled based on an outcome of the second radiofrequency function and/or the vice versa.

In an embodiment, the method further may comprise activating the second radiofrequency-based sensing function based on a sensing result of the first radiofrequency-based sensing function.

In this embodiment, the activation of the second radiofrequency-based sensing function is based on the sensing result of the first radiofrequency-based sensing function. For example, the activity detection is activated when the presence is detected. This is advantageous to prevent network congestion, improve network reliability and if the nodes are battery-powered, it also saves power.

In an embodiment, the method may further comprise selecting the first and/or the second set of nodes based on one or more of location of the nodes, mounting orientation, hardware capability, beam forming capability, wireless interference, reachability criterion. In an embodiment, the method may further comprise selecting the first and/or the second set of nodes based on a requirement for the first and/or the second radiofrequency-based sensing function.

In these embodiments, the selection of the nodes is advantageously optimized for improving performance of radiofrequency-based sensing function(s). For example, for breathing detection, nodes closer to a human body may be preferred over nodes with a distance from the human body. Different selection criteria may be defined based on hardware capabilities of nodes, wireless interference etc.

In an embodiment, the first radiofrequency-based sensing function may comprise a first communication technology, and the modified first radiofrequency-based sensing function comprises a second communication technology.

A communication technology is defined by communication technology parameters including one or more of a communication protocol, one or more frequencies, a channel bandwidth, a number of streams, a stream data rate, and a modulation. Changing one of the communication technology parameters changes the communication technology. For example, the first communication technology may be a narrow band communication and the second communication technology may be a broad band communication technology. For narrowband communication technologies, the bandwidth of a signal does not significantly exceed a channel's coherence bandwidth. For wideband communication technologies, the signal significantly exceeds a channel's coherence bandwidth. The narrowband communication technologies can for example include communication protocols such as ZigBee, Bluetooth, Thread, or other narrowband communication protocols. The wideband communication technologies can for example include wideband communication protocols, such as one or more of the IEEE 802.11 wideband protocols, including WiFi in 2.4 GHz band, WiFi in 5 GHz band, or WiFi in 60 GHz band, Ultra-wideband (UWB) or any other wideband communication protocols. Using a narrowband communication technology for RF-based sensing can allow to reduce energy consumption. Using a wideband communication technology for RF-based sensing can allow to include more nodes in the RF-based sensing system performing the RF-based sensing.

In an embodiment, the modified first radiofrequency-based sensing function may comprise one or more of modifying transmission power, rate of transmission of the radiofrequency signals, sensing sensitivity, a frequency spectrum of the radiofrequency signals.

The parameters of the first radiofrequency-based sensing function may be modified, e.g., the transmission power may be adjusted. In an example, the transmission power of the first set of nodes may be different from the second set of nodes e.g., to avoid interference. In another example, rate of transmission of radiofrequency signals may be adjusted, e.g., based on a sensing result. Other parameters such as sensing sensitivity and/or frequency spectrum of the radiofrequency signals may be modified. In an example, the nodes may be utilized to transmit different radiofrequency spectrum, e.g., 2.4 GHz, 5 GHz, 60 GHz (mm-wave waves).

According to a second aspect, the object is achieved by a control device for controlling a radiofrequency-based sensing system, wherein the radiofrequency-based system comprises a plurality of nodes each arranged for transmitting and/or receiving radiofrequency signal for radiofrequency-based sensing in an environment; wherein the control device comprises a processor arranged for executing (at least some of) the steps of the method according to the first aspect.

According to a third aspect, the object is achieved by a system for controlling a radiofrequency-based sensing system, wherein the system comprises a control device according to the second aspect; and a plurality of nodes arranged for transmitting and/or receiving radiofrequency signals for radiofrequency-based sensing in an environment.

According to a fourth aspect, the object is achieved by a computer program product comprising instructions which, when the program is executed by a computer, cause the computer to carry out the (at least some of the) steps of the method of the first aspect.

It should be understood that the control device, the system and the computer program product may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices, and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
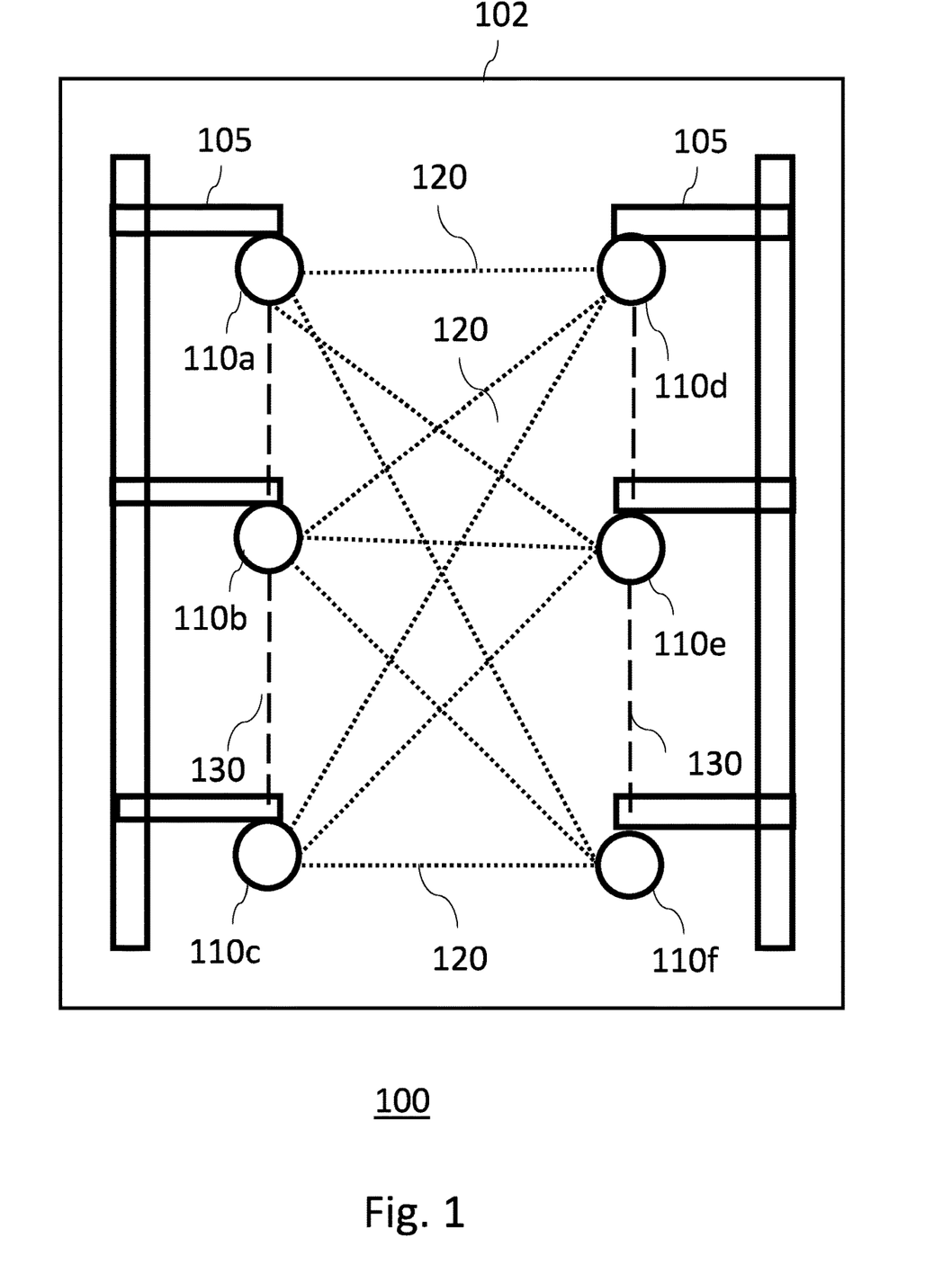
FIG. 1 shows schematically and exemplary an embodiment of a system for controlling a radiofrequency-based sensing system.

FIG. 1 shows schematically and exemplary an embodiment of a system 100 for controlling a radiofrequency-based sensing system. In this exemplary figure, the system 100 comprises an indoor environment 102, e.g., a retail store. The system 100 further comprises shelf 105 to hold supermarket products. These shelves 105 may be placed in front of each other with an aisle in between. The users (not shown) may walk through the aisle to shop. The system 100 further comprises a plurality of nodes 110a-f each arranged for transmitting and/or receiving radiofrequency signals for radiofrequency-based sensing in the environment 102. Each node 110a-f comprises transceiver or transmitter/receiver (not shown) for transmitting and/or receiving the radiofrequency signals.

In the exemplary figure, the nodes 110a-f are lighting devices. A lighting device is a device or structure arranged to emit light suitable for illuminating an environment 102, providing or substantially contributing to the illumination on a scale adequate for that purpose. A lighting device comprises at least one light source or lamp, such as an LED-based lamp, gas-discharge lamp or filament bulb, etc., optionally with any associated support, casing or other such housing. Each of the lighting devices may take any of a variety of forms, e.g., a ceiling mounted lighting device, a wall-mounted lighting device, a wall washer, or a free-standing lighting device (and the lighting devices need not necessarily all be of the same type). In this figure, the lighting devices are spotlights to illuminate, e.g., the products placed in the shelves. Additionally, and/or alternatively, the nodes 110a-f may be a sensor, a gateway, or any device with an RF radio.

The nodes 110a-f may be arranged to communicate with each other. In an example, all the nodes 110a-f may have a communication link with each other. Alternative, nodes 110a-f may have a communication link with other selected nodes, e.g., based on distance, compatibility etc. The communication may be according to any suitable communication protocol such as Zigbee, Bluetooth, Wifi etc. In this exemplary figure, each node 110a-f has a communication link with each other. The nodes 110a-f are arranged in a grid structure. The direction of the communication paths between the nodes 110a-f are shown via the dotted lines 120 or dashed lines 130.

A first set of nodes 110a-f from the plurality of nodes 110a-f may be selected to form a first subset and a second set of nodes 110a-f from the plurality of nodes 110a-f may be selected to form a second subset. The selection may be based on a direction of communication path (as represented by either the dotted lines 120 or the dashed lines 130) from a transmitting node to a receiving node in the plurality of nodes 110a-f. In this example, the first subset of nodes 110a-f may be selected having a direction of communication path from a transmitting node to a receiving node in a first plane e.g., shown via the dotted line 120, and the second subset of nodes 110a-f may be selected having a direction of communication path from a transmitting node to a receiving node in a second plane e.g., shown via the dashed line 130. The direction of communication path 120, 130 may be orthogonal to each other. For example, the communication path 120 may be comprised in the horizontal plane whereas the communication path 130 may be comprised in the vertical plane. Any other angular planes may also be envisioned.

One of the benefits of such a layout of the nodes 110a-f as shown in FIG. 1 is that it may enable rich RF sensing parameters by taking a two-pronged approach, e.g., to distinguish a first radiofrequency-based sensing function and a second radiofrequency-based sensing function. For example, simple presence detection may be distinguished from actual object (shelf/product) interaction. In the retail environment 102, usually shopper's motion and/or interaction happens either in paralleled or perpendicular to the grid of RF sensors which allows to distinguish which RF nodes 110a-f more easily would form a network for sensing in one plane/direction and which in another. In the case of retail environment 110a-f shoppers move in parallel to the grid while interaction happens perpendicular to it. Therefore, the presence of an object (e.g., a shopper) may be detected via signal distortions between horizontal RF neighbors and the object interaction may be detected via signal distortions between vertical RF neighbors. Other examples of radiofrequency-based sensing function may include location detection, breathing rate detection, sleep patterns monitoring etc. Other examples not mentioned here but known in the art are not excluded.

In an example, the interferences between the first and the second plans in terms of sensing disturbances in the RF signal may be used for adjusting or configuring parameters of the radiofrequency sensing. For example, sensing sensitivity and/or trigger threshold may be adjusted e.g., for the first subset and/or the second subset for instance to minimize false positives and false negatives.

In an example, RF sensing may be used for retail intelligence, e.g., mapping consumer activity over time to learn shopper's behaviour, gathering retail intelligence for rich shopping data. Here, the positioning data may be used to determine not only positional interaction, but over time as well, provide more intelligent control over retail lighting etc.

RF sensing may be used for lighting control or UV disinfection control. The lighting devices may be arranged for emitting light (lighting nodes) which activated upon/during presence detection. In case of the latter, at least one of the plurality of nodes 110a-f may be arranged for transmitting electromagnetic radiation signals in the ultraviolet frequency (UV) spectrum; and wherein the at least one of the plurality of nodes 110a-f may be arranged for transmitting UV signals after the second subset has detected an activity and the first subset no longer detects presence. In this example, purification light may be applied only when no people are near and after actual interaction with the particular shelf.

The grid lay-out of the nodes 110a-f may be commissioned or machine learned. For instance, it can be learnt using the principle of near-simultaneous distortion detection, e.g., the RF nodes which always simultaneously detect signal distortions can be concluded to be co-located. When placement of the RF sensors is not in a grid lay-out (e.g., due to differing shelf heights) the system can be calibrated, after which the presence, location and shelf interaction can be derived from distortions picked up by the RF sensors and the analysis provided by the control system. In an example, the internal RF-driver position (e.g., linear device endcap) may be taken into account to improve RF sensing (commission or orientation sensing).

Figure 2:
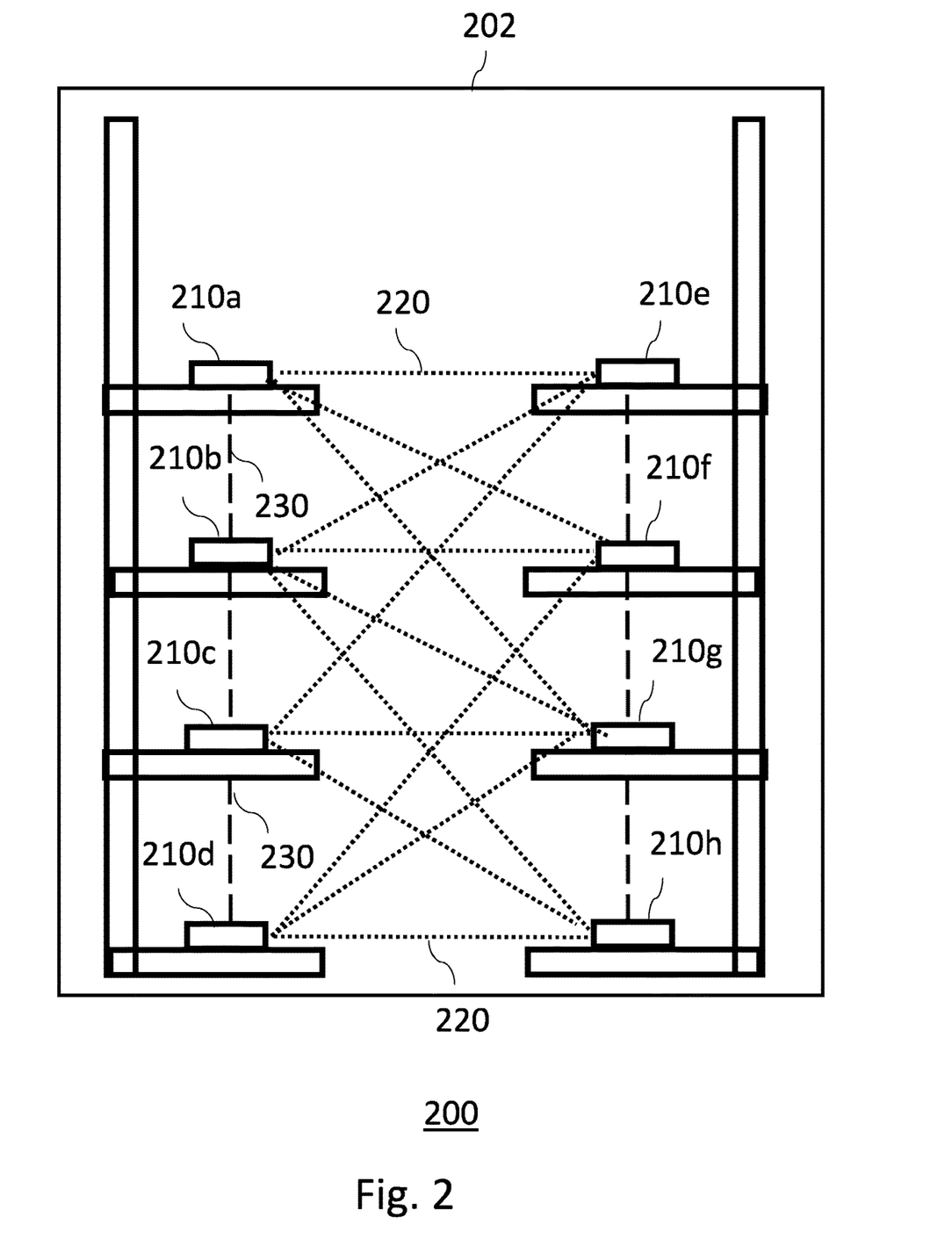
FIG. 2 shows schematically and exemplary another embodiment of a system for controlling a radiofrequency-based sensing system.

FIG. 2 shows schematically and exemplary another embodiment of a system 200 for controlling a radiofrequency-based sensing system. FIG. 2 exemplary shows a top view of a fitting room area e.g., in a clothing store 202, whereby each fitting room comprises a mirror with integrated RF (lighting) devices 210a-h. The direction of communication path is shown via the dotted line 220 or dashed line 230. In this example, the first subset 210a-h may be arranged for performing the first radiofrequency-based sensing function in a first area and the second subset may be arranged for performing the second radiofrequency-based sensing function or the modified first radiofrequency-based sensing function in the second area. In an example, the second area may be smaller than the first area or at least may be different in size. For instance, the first radiofrequency-based sensing function comprises detect user presence/traffic in the general area, while the second radiofrequency-based sensing function comprises detecting occupancy of each of the fitting rooms. In alternate examples, the system 200 may comprise planes and trains, in parking garages or in office space as long as every desk is equipped with a RF node 210a-h (e.g., as part of a desk light or luminous desk divider).

Figure 3:
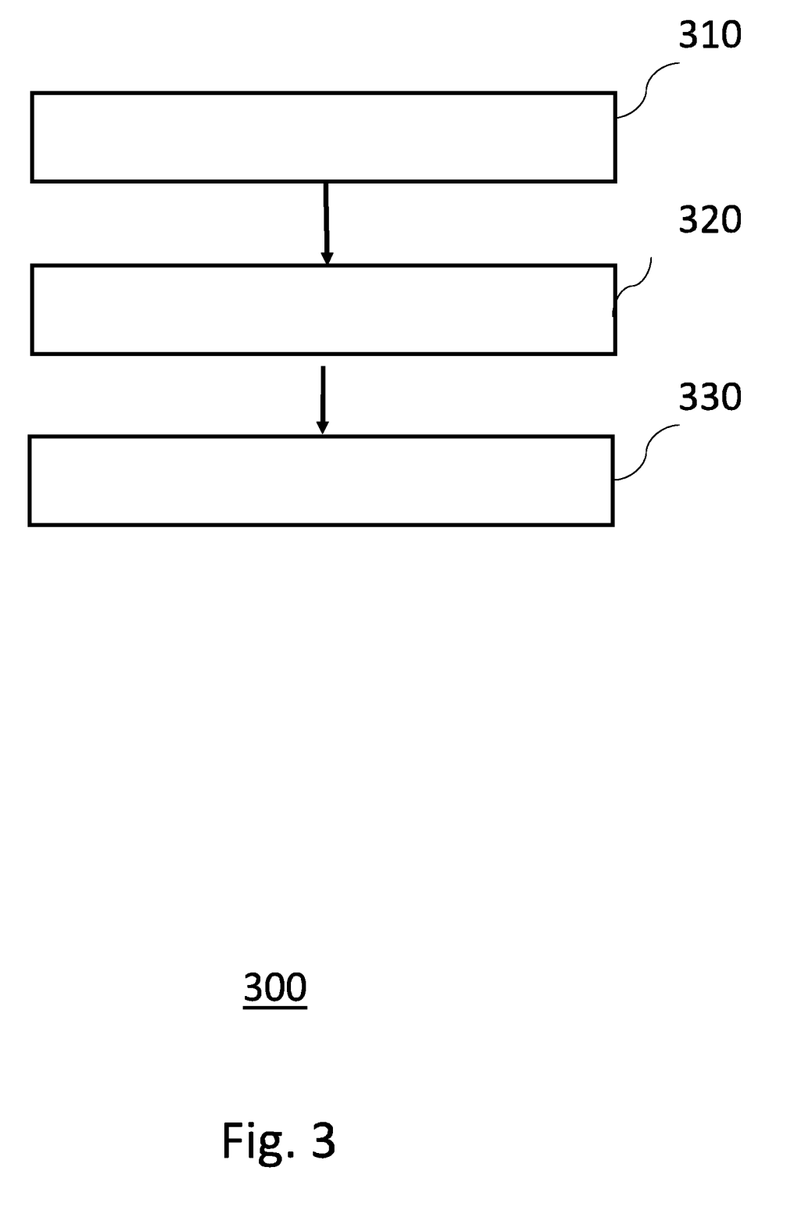
FIG. 3 shows schematically and exemplary a flowchart illustrating an embodiment of a method for controlling a radiofrequency-based sensing system.

FIG. 3 shows schematically and exemplary a flowchart illustrating an embodiment of a method 300 for controlling a radiofrequency-based sensing system, which comprises a plurality of nodes 110a-f, 212a-h each arranged for transmitting and/or receiving radiofrequency signals for radiofrequency-based sensing in an environment 102, 202. The plurality of nodes 110a-f, 212a-h may be further arranged for transmitting and/or receiving radiofrequency signals for network communication. In an example, the radiofrequency signals for network communication are analyzed for RF sensing.

The method 300 comprises selecting 310 a first set of nodes from the plurality of nodes 110a-f, 212a-h to form a first subset and a second set of nodes from the plurality of nodes 110a-f, 212a-h to form a second subset; wherein the selection 310 is based on a direction of communication path 120, 130, 220, 230 from a transmitting node to a receiving node in the plurality of nodes 110a-f, 212a-h. The first and the second subsets may comprise at least partially overlapping nodes. The examples in FIG. 1 and FIG. 2 show a complete overlap.

The selection 310 may be further based on location of the nodes 110a-f, 212a-h, mounting orientation, hardware capabilities, beam forming capability, wireless interference, reachability criterion. The location information is relevant since it determines e.g., the direction of the communication path. Similarly, the mounting orientation has a similar effect on the direction of the communication path. For some applications, beam forming may play an important role, e.g., to direct communication in a particular direction and to provide direction of communication path in various directions. Since, RF sensing is based on analyzing the received RF signal, hardware capabilities, e.g., processing capabilities is also an important selection criterion. The selection 310 may be further based on a requirement for the first and/or the second radiofrequency-based sensing function.

The method 300 may further comprise assigning 320 a first radiofrequency-based sensing function to the first subset and a second radiofrequency-based sensing function or a modified first radiofrequency-based sensing function to the second subset. In an example, the first radiofrequency-based sensing function is presence detection, and the second radiofrequency-based sensing function is activity detection.

The modified first radiofrequency-based sensing function may comprise modifying transmission power, rate of transmission of the radiofrequency signals, sensing sensitivity, a frequency spectrum of the radiofrequency signals. For example, RF sensing may also be used to safe energy, for instance, for RF sensing to work, frequent radiofrequency signals need to be sent between the plurality of nodes 110a-f, 210a-h, while monitoring e.g., changes in signal strength, which all consumes energy. To safe energy, for instance if the first radiofrequency-based sensing function is presence sensing with high transmission rate (or active continuously), the second radiofrequency-based sensing function may be a modified function of presence sensing wherein the rate of transmission of the radiofrequency signals is low compared to the first radiofrequency-based sensing function.

The second radiofrequency-based sensing function may be activated based on a sensing result of the first radiofrequency-based sensing function. For energy saving, the first radiofrequency-based sensing function may be continuously active, whereas the second radiofrequency-based sensing function is only activated when the first radiofrequency-based sensing function detects an event.

The first radiofrequency-based sensing function may comprise a first communication technology, and the modified first radiofrequency-based sensing function may comprise a second communication technology. A communication technology is defined by communication technology parameters including one or more of a communication protocol, one or more frequencies, a channel bandwidth, a number of streams, a stream data rate, and a modulation. Changing one of the communication technology parameters changes the communication technology.

Figure 4:
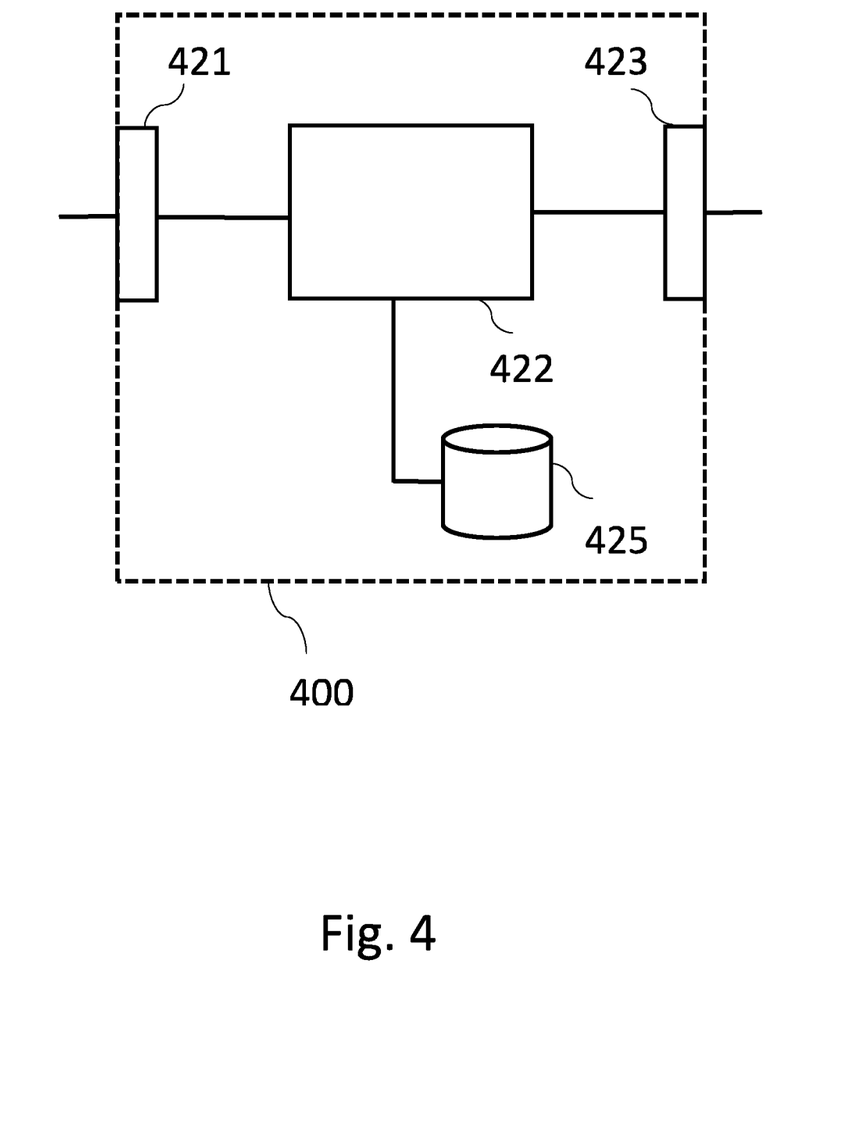
FIG. 4 shows schematically and exemplary an embodiment of a control device for controlling a radiofrequency-based sensing system.

The method 300 may further comprise instructing 330 the first subset to perform the first radiofrequency-based sensing function and the second subset to perform the second radiofrequency-based sensing function or the modified first radiofrequency-based sensing function. The instructions may be communicated to the first and the second subset via the radiofrequency signals. The instructions may be received from a control device 400 or any device external to the control device and the plurality of nodes 110a-f, 210a-h.

FIG. 4 shows schematically and exemplary an embodiment of a control device 400 for controlling a radiofrequency-based sensing system. The control device 400 may comprise an input unit 421 and an output unit 423. The input 421 and the output 423 units may be comprised in a transceiver (not shown) arranged for receiving (input unit 421) and transmitting (output unit 423) communication signals, e.g., to and from the plurality of nodes 110a-f, 210a-h. The communication signals may comprise control instructions, e.g., to assign a first radiofrequency-based sensing function to the first subset and a second radiofrequency-based sensing function or a modified first radiofrequency-based sensing function to the second subset.

The control device 400 may further comprise a memory 425 which may be arranged for storing communication IDs of the plurality of nodes 110a-f, 210a-h. The memory 425 may also be arranged for storing a layout of the plurality of nodes 110a-f, 210a-h. The grid lay-out of the nodes 110a-f, 210a-h may be commissioned, or machine learned. The control device 400 may be arranged to select one or more nodes 110a-f, 210a-h for processing the radiofrequency signals for radiofrequency-based sensing functions. The selection may be based on the location of the node, hardware capabilities, available resources etc. The control device 400 may select one node from each subset for processing the radiofrequency signals for the radiofrequency-based sensing.

The control device 400 may comprise a processor 422 arranged for selecting 310 a first set of nodes from the plurality of nodes 110a-f, 210a-h to form a first subset and a second set of nodes from the plurality of nodes 110a-f, 210a-h to form a second subset; wherein the selection is based on a direction of communication path from a transmitting node to a receiving node in the plurality of nodes. The processor 422 may be further arranged for assigning a first radiofrequency-based sensing function to the first subset and a second radiofrequency-based sensing function or a modified first radiofrequency-based sensing function to the second subset and may be yet further arranged for instructing the first subset to perform the first radiofrequency-based sensing function and the second subset to perform the second radiofrequency-based sensing function or the modified first radiofrequency-based sensing function.

The processor 422 may be arranged for processing of the radiofrequency signals for radiofrequency-based sensing, wherein the control device 400 may receive the radiofrequency signals from a (collector) node. The (collector) node may be designated to collect and store all the radiofrequency signals and arranged for sending the collected radiofrequency signals to the control device 400 for processing. Additionally, and/or alternatively the processing may be performed external to the node or to the control device 400, e.g., in a server or in cloud. The processing may be based on received signal strength indicator (RSSI) and/or based on channel state information (CSI). In an example, the selection of RSSI and/or CSI may be based on the direction of communication path as well. The processor 422 may be arranged for learning the layout of the plurality of nodes 110*a-d*, 210*a-h*, e.g., via machine learning techniques. Additionally, and/or alternatively, the processor 422 may receive the layout of the plurality of nodes 110*a-d*, 210*a-h* from an external device, e.g., from the cloud, from a user's device such as a mobile phone, tablet etc.

The control device 400 may be implemented in a unit separate from the plurality of nodes 110*a-f*, 210*a-h*, such as wall panel, desktop computer terminal, or even a portable terminal such as a laptop, tablet or smartphone. Alternatively, the control device 400 may be incorporated into the same unit as one of the plurality of nodes 110*a-f*, 210*a-h*. Further, the control device 400 may be implemented in the environment 102, 202 or remote from the environment (e.g., on a server); and the control device 400 may be implemented in a single unit or in the form of distributed functionality distributed amongst multiple separate units (e.g., a distributed server comprising multiple server units at one or more geographical sites, or a distributed control function distributed amongst the plurality of nodes 110*a-f*, 210 a-h). Furthermore, the control device 400 may be implemented in the form of software stored on a memory (comprising one or more memory devices) and arranged for execution on a processor (comprising one or more processing units), or the control device 400 may be implemented in the form of dedicated hardware circuitry, or configurable or reconfigurable circuitry such as a PGA or FPGA, or any combination of these.

Regarding the various communication involved in implementing the functionality discussed above, to enable the control device 400, for example, to transmit and receive communication signals, these may be implemented in by any suitable wireless means, such as a local (short range) RF network, e.g., a Wi-Fi, ZigBee or Bluetooth network; or any combination of these and/or other means.

The method 300 may be executed by computer program code of a computer program product when the computer program product is run on a processing unit of a computing device, such as the processor 422 of the control device 400.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling a radiofrequency-based sensing system, wherein the radiofrequency-based system comprises a plurality of nodes each arranged for transmitting and/or receiving radiofrequency signals for radiofrequency-based sensing in an environment;
    wherein the method comprises:
        selecting a first set of nodes from the plurality of nodes to form a first subset and a second set of nodes from the plurality of nodes to form a second subset; wherein the selection is based on a direction of communication path from a transmitting node to a receiving node in the plurality of nodes, wherein each subset comprises at least two nodes from the plurality of nodes;
        assigning a first radiofrequency-based sensing function to the first subset and a second radiofrequency-based sensing function or a modified first radiofrequency-based sensing function to the second subset;
        instructing the first subset to perform the first radiofrequency-based sensing function and the second subset to perform the second radiofrequency-based sensing function or the modified first radiofrequency-based sensing function;
    wherein the first subset and the second subset is at least partially overlapping with one or more common nodes in both subsets.

2. The method according to claim 1, wherein the first subset comprises nodes having a direction of communication path from a transmitting node to a receiving node in a first plane, and the second subset comprises nodes having a direction of communication path from a transmitting node to a receiving node in a second plane.

3. The method according to claim 2, wherein the first plane is orthogonal to the second plane.

4. The method according to claim 1, wherein the first subset is arranged for performing the first radiofrequency-based sensing function in a first area and the second subset is arranged for performing the second radiofrequency-based sensing function or the modified first radiofrequency-based sensing function in a second area.

5. The method according to claim 1, wherein the first radiofrequency-based sensing function is presence detection, and the second radiofrequency-based sensing function is activity detection.

6. The method according to claim 5, wherein at least one of the plurality of nodes is arranged for transmitting electromagnetic radiation signals in the ultraviolet frequency (UV) spectrum; and wherein the at least one of the plurality of nodes is arranged for transmitting UV signals after the second subset has detected an activity and the first subset no longer detects presence.

7. The method according to claim 1, wherein the plurality of nodes comprises one or more lighting devices arranged to emit light for illuminating the environment, wherein the method further comprises
controlling the one or more lighting devices based on a first set of control parameters according to the first radiofrequency-based sensing function, and
controlling one or more lighting devices based on a second set of control parameters according to the second radiofrequency-based sensing function.

8. The method according to claim 1, wherein the method further comprises activating the second radiofrequency-based sensing function based on a sensing result of the first radiofrequency-based sensing function.

9. The method according to claim 1, wherein the method further comprises:
selecting the first and/or the second set of nodes based on one or more of location of the nodes, mounting orientation, hardware capabilities, beam forming capability, wireless interference, reachability criterion.

10. The method according to claim 1, wherein the method further comprises:
selecting the first and/or the second set of nodes based on a requirement for the first and/or the second radiofrequency-based sensing function.

11. The method according to claim 1, wherein the first radiofrequency-based sensing function comprises a first communication technology, and the modified first radiofrequency-based sensing function comprises a second communication technology.

12. The method according to claim 1, wherein the modified first radiofrequency-based sensing function comprises one or more of modifying transmission power, rate of transmission of the radiofrequency signals, sensing sensitivity, a frequency spectrum of the radiofrequency signals.

13. A control device for controlling a radiofrequency-based sensing system, wherein the radiofrequency-based system comprises a plurality of nodes each arranged for transmitting and/or receiving radiofrequency signals for radiofrequency-based sensing in an environment; wherein the control device comprises a processor configured to execute the steps of the method according to claim 1.

14. A system for controlling a radiofrequency-based sensing system, wherein the system comprises:
a control device according to claim 13; and
a plurality of nodes arranged for transmitting and/or receiving radiofrequency signals for radiofrequency-based sensing in an environment.

15. A computer program product comprising instructions which, when the program is executed by a processor comprised in a control device, cause the processor to control a system to carry out the steps of the method of claim 1.

* * * * *